Patented Feb. 28, 1928.

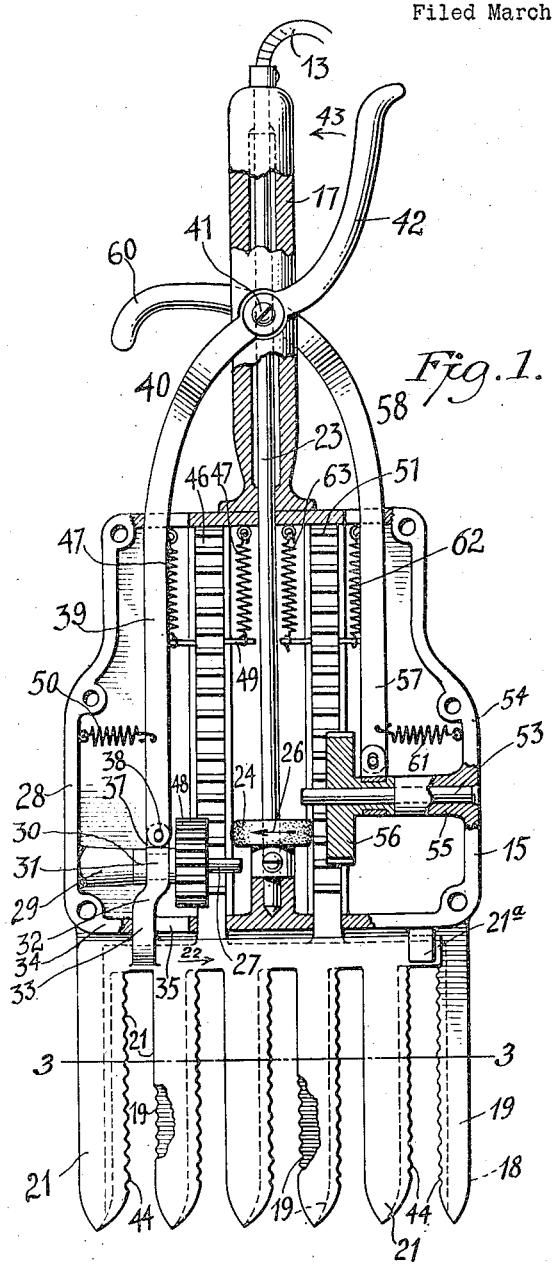
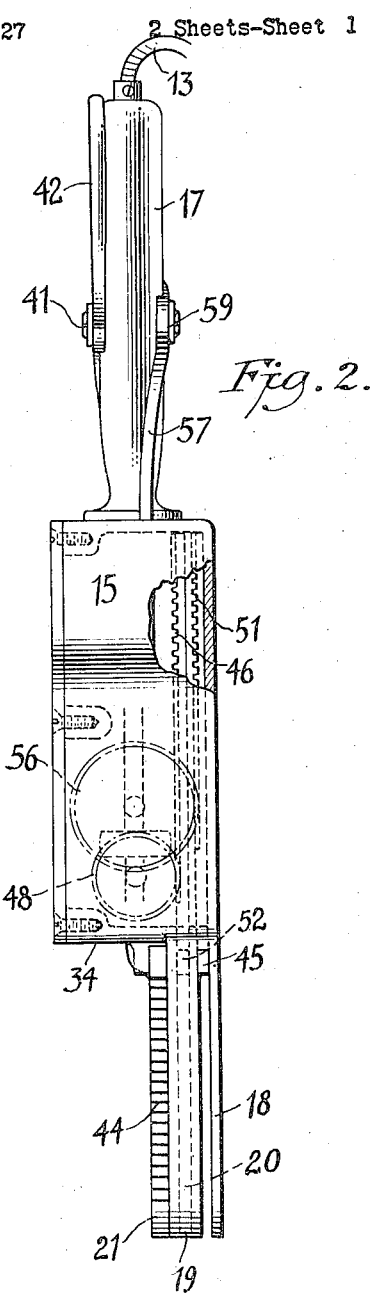
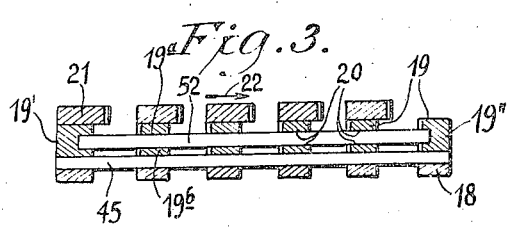

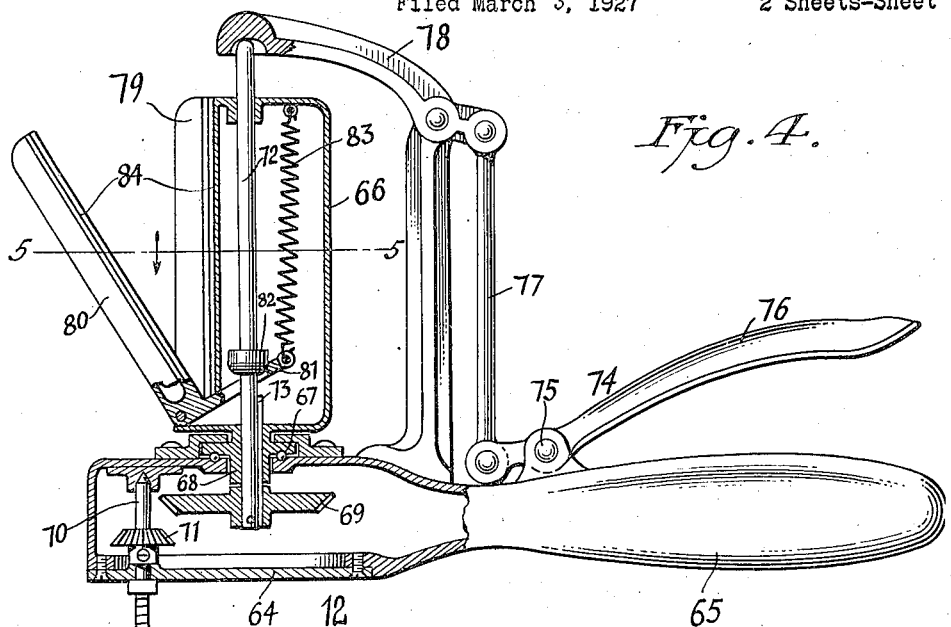

1,660,659

UNITED STATES PATENT OFFICE.

ALEXANDER VERMES, SOLOMON STERN, AND LEIB GRODZICKER, OF NEW YORK, N. Y., ASSIGNORS, BY DIRECT AND MESNE ASSIGNMENTS, TO INTERNATIONAL FOWL PLUCKER CORPORATION, OF NEW YORK, N. Y., A CORPORATION OF NEW YORK.

FEATHER-REMOVING APPARATUS.

Application filed March 3, 1927. Serial No. 172,280.

This invention relates to devices for dry picking chickens, turkeys, geese, duck and other fowl and game birds, the object being to provide efficient gripping devices to engage the feathers of a dry fowl, said devices being provided with automatic means for pulling the gripped or engaged feathers from the fowl's body without using manual power or exertion and providing great speed in operation.

Another object of the invention resides in automatic means for cleaning the gripping devices between the picking or feather pulling operations.

Broadly speaking, the invention comprises two main elements one for dry picking the body feathers of a fowl, the other for picking the wing feathers thereof, said elements being separately described below, so it follows, that our invention consists in the general combination of the various details making up these two principal features.

The two elements of the invention are preferably driven from a common source of power, such as an electric motor, thus making it possible for two operatives to work together, one using the body picker and the other the wing picker and greatly increasing the operating results.

The invention has for its further objects to provide certain other novel features, all of which will be more clearly defined in the following description and then pointed out in the appended claims.

In the drawings corresponding reference characters are employed to designate like parts in the views, in which:—

Fig. 1, is a partial sectional elevation of our improved dry picker adapted for use on the body of a fowl, parts being broken away, to better show the construction.

Fig. 2, is a side elevation of the device of Fig. 1, the side wall of the casing being broken out to disclose the relative positions of a pair of rack bars forming part of the construction.

Fig. 3, is a detail plane section on the line 3—3 of Fig. 1.

Fig. 4, is a composite view of the entire apparatus making up our invention showing driving means and connections therefor. The wing picker being shown in partial sectional elevation with the parts in the normal inoperative positions, and the body picker being shown in perspective on a reduced scale.

Fig. 5, is a detail horizontal section taken on the line 5—5 of Fig. 4, but showing the gripping element closed to hold a bunch of wing feathers while the pulling drum is rotated.

Referring now more closely to the drawings by characters of reference, the numeral 10, (Fig. 4) indicates an electric motor as a convenient source of power for driving both, the body and the wing feather pickers, indicated in general by the numerals 11 and 12, respectively. Flexible shafts 13 and 14 are provided to drive said two devices from the motor.

The body feather plucker or remover 11, has a housing 15 from which sets of stationary and movable fingers or combs 16 project, the construction and purpose of which will be described presently. A hollow handle 17 is arranged to grip the plucker thereby and the flexible shaft 13, reaches the various mechanisms contained in said housing 15, and calculated to move certain elements within and the sets of fingers or combs 16 in front of the same at the necessary intervals, through said hollow handle.

Referring now to Figs. 1, 2 and 3 more specifically, the housing or casing 15 has a lowermost set of fingers or a comb 18, integral therewith or permanently secured thereto. A second or intermediate set of fingers, or comb unit 19 is arranged above said comb 18, also integral with the housing 15, the individual fingers of said set 19 showing slots or recesses 20 going longitudinally through them to about the front wall of the casing 15, and practically dividing each finger into an upper finger 19ª and a lower finger 19ᵇ, with the exception of the two outermost fingers 19' and 19", which preferably may be left intact from about their centers to their outer sides.

A third top set of fingers or comb unit 21 is finally arranged closely riding or sliding over the intermediate set 19 in a transversal direction in front of the housing 15, as indicated by the arrow 22, in Fig. 3, being held, guided and moved by means to be more fully described hereinafter.

Flexible shaft 13 is continued within the hollow handle 17 and housing 15 in a rigid, preferably metal, shaft end 23, properly housed and journaled, as shown, and carries at its lower end the friction disk 24. When motor 10 is set into rotation, as by the closing of switch 25, the disk 24 will be kept in rotation, in the arrangement here shown in the direction of arrow 26.

A short pin 27 is firmly secured in the left hand side wall 28 of the housing 15, as at 29, and carries a sleeve member 30, slidable and rotatable on said pin 27. A ring element 31 encircles said sleeve, in an appropriate groove therein, so that said sleeve may rotate within said ring.

The front portion of the ring 31 is continued in a rigid and comparatively strong arm 32 and the topmost set of fingers or comb unit 21, is integral with said arm 32, or is secured thereto, so as to move therewith, the end 33 of said arm reaching outside of the front wall 34 of the housing 15 through a suitable elongated hole or slot 35.

The rear portion of the ring 31 carries a short second arm 36, the end of which is connected by an appropriately yielding hinge joint 38 to the longer lower arm 39 of a lever 40, rockable on the top of handle 17, as at 41, and having an upper shorter arm 42. It is obvious that if arm 42 is pressed towards the handle 17, in the direction of arrow 43, as by the hand of the operator holding and pressing the two together, sleeve 31 and upper comb 21 therewith, will move to the right, as indicated by arrow 22.

In the use of our device, the lowermost comb 18 is used to go between the feathers of the bird to be plucked and to press the device closely to the body of the bird, thereby holding its skin down and preventing its being torn when the feathers are removed, as will be described presently. Arm 42 is thereupon pressed to handle 17 which will cause the upper comb 21 to slide in a transversal direction, as described, and indicated by arrow 22. The middle comb 19 remaining stationary, the feathers will be caught and tightly gripped between the units of the combs 19 and 21. To increase this action, said comb units may also be provided with reversely arranged grooves 44 at their cooperating surfaces.

A transversal bar or knife 45 is now provided between the combs 18 and 19 which bar is integral with or is secured to a rack 46, at the front end of it, said rack being arranged in a suitable guide to slide in a longitudinal direction in the left hand portion of housing 15 and normally being kept in a withdrawn position by the springs 47.

Sleeve 30, however, also carries a gear 48 at its outer end, rotatable therewith, and adapted to mesh with rack 46 and move the same. When said sleeve is moved inwardly in the direction of arrow 22, as described hereinabove, the gear 48 will be set in complete mesh with the rack 46, moving in a straight line across the same, and will finally reach friction disk 24 and will be driven by it, as it is obvious from the arrangement shown in the drawings. This will cause rack 46 to shoot in a forward direction, against the action of springs 47, and the bar or knife 45 will be moved in a rapid manner across the bottom portions of the feathers previously caught between the combs 19 and 21. Since the skin of the poultry or other bird is held tightly pressed by the lowermost comb 18, the rapid hitting action of bar 45 will pluck or tear the comparatively strong resisting feathers out of their sockets in the skin without shearing or cutting them. This action and result is important since our invention primarily is designed to pluck such feathers without cutting them as it is prescribed by the rules of the Jewish religion. Of course, for other purposes, our invention may be used with sharper, knife like bars 45 also.

The plucking action is finished when the bar 45 reaches about the tips of the combs 19 and 21 in which position it will be stopped by appropriate limiting means on the rack, reaching the front wall 34, which in this case may be represented by the spring pins 49. The springs may be designed to slow the movement of the bar when nearing its limit and the stops may also be covered by rubber (not shown), or other means may be employed to take up the impact of the moving parts, as is well known in the art.

After the plucking operation is finished, the arm 42 is released, spring 50 will return arm 39 and sleeve 30, with the gear 48 and upper comb 21, into their original released positions, springs 47 will withdraw rack 46 and bar 45, and the process may be repeated over the next portion of the skin of the bird.

We however, provided means whereby before continuing the operations, the device may be automatically, quickly and efficiently cleaned of the feathers plucked. For this purpose a second rack 51 is slidably guided in the right hand portion of the housing 15, carrying at its front end a second cleaning bar 52, placed above the first plucking bar 45, and slidable within and across the said slots or recesses 20 in comb 19. A second pin 53 is secured into the right hand wall 54 of the housing 15, as at 55, and thereon is also sliding a gear 56, arranged in a similar manner to gear 48 and movable through the arm 57 of a second lever 58, rockable on the underside of handle 17, as at 59. The upper upper arm 60 of lever 58 is turned upwardly so that after the arm 42 is released, a finger or the thumb of the operator may catch said arm 60 and pull it towards handle 17. This will cause gear 56 to contact with friction disk 24 and to be driven thereby, shooting rack 51, and bar 52 therewith, in a forward direction. Bar 52 will thus effectively remove the feathers plucked from between the comb elements. After releasing, also the second arm 60, springs 61, and 62 and 63, respectively, will return the gear 56 and rack 51 into their original positions, and the device is now ready to be used over the next portion of the body of the bird.

A guide 21ª may be provide for the comb 21 in the front of the device, and for better understanding we may also remark that, one rack may be placed lower than the other, both reaching their bars in a suitable manner so as to avoid one another, the gear for the lower rack being made somewhat larger than the other gear. To make it possible, however, to completely clean the body of a bird of its feathers, and particularly in conformity with the rules of the Jewish religion, it was necessary for us to invent a second part to our device, said second part being designed to remove the especially heavy and strong wing feathers of a bird, and having been in general designated hereinbefore by the numeral 12 in Fig. 4.

This wing feather remover part 12 of our invention also shows a hollow housing, indicated by character 64, and having a handle 65. A perpendicular second hollow housing 66 is arranged on top of housing 64, rotatable thereon, as by the ball bearing 67, the lower portion 68 of the same penetrating within the first housing 64. A bevel gear 69 is secured to the mentioned end 68 and is rotatable therewith, normally being kept in the raised position shown in Fig. 4, by means to be described presently. Flexible shaft 14 also has a short rigid shaft end 70, journaled in housing 64 and carrying the small bevel gear 71, designed to mesh with the gear 69, when the same is lowered from its position shown.

The lowering of gear 69 is obtained by securing the same on the end of a shaft 72 passing through the center of housing 66 and being slidable in the lower portion of the same, while constantly being secured thereto, as by the means of feather 73 on the shaft and an appropriate longitudinal groove in the lower or hub portion of housing 66. When said shaft is pushed in a downward direction, sliding in the bore of hub 68, gear 69 will be put in mesh with gear 71, and will be rotated by the power of the flexible shaft 14. The rotation of gear 69 will obviously carry the rotation of shaft 72 and the housing 66 with it.

A lever 74 is rockable on handle 65, as at 75, and when the grip portion 76 of the same is pressed to handle 65, shaft 72 will be pressed downwardly within housing 66, by the intermediacy of the link 18 and lever elements 77 and 78, as it will be obvious by inspecting Fig. 4.

Housing 66 preferably is of cylindrical cross section and has a sunken segmental portion 79. (Figs. 4 and 5.) A hinged lid 80 fits into the sunken portion of the housing, terminating in an inwardly reaching yoke member 81 within housing 66, the shaft 70 72 passing through the yoke and contacting with the same through the disk 82, secured on said shaft. A spring 83 normally pulls said yoke in an upward direction, thereby raising the shaft 72, disengaging gears 71 and 69 and also opening the hinged lid 80.

When it is desired to pluck or tear out the extra strong wing feathers of a bird, said feathers will be placed between the lid 80 and sunken portion 79 in a crosswise manner, and then the grip 76 firmly pressed to the handle 65 with one hand of the operator, while the other hand holds the wing of the bird to supply the necessary reaction for the operation of the device. On the instant of the closing of grip 76 and handle 65 together, shaft 72 will be lowered, the lid closed through yoke 81 and the feathers caught, while the meshing of the gears in said lowered position of the shaft will rapidly rotate the closed housing 66 and will tear the feathers from their sockets in the wing. Upon releasing the grip 76, the single spring 83 will return all the parts into their original positions, as will be apparent. The wing feathers being comparatively small in number, they may conveniently be removed from the device manually and the operation repeated.

Lid 80 and the sunken part 79 may show axial co-operating grooves and projections 84 to better grip the feathers.

What we claim as new, is:—

1. A feather picking device, comprising a first set of means to grip the feathers on the body of the bird at a distance from its skin, and a second means to pass underneath said first means and remove the feathers, by tearing them out of their sockets.

2. In a device as set forth in claim 1, said gripping means including a comb like structure to go between the feathers and to close thereon.

3. In a device of claim 1, said gripping means comprising a stationary comb like structure, and a movable comb like structure the two being adapted to close upon one another or to be released from one another.

4. In a device of claim 1, said removing means comprising a transversal element underneath said gripping means, adapted to swiftly move across the feathers near their roots.

5. In a device of claim 1, means to press down the skin of the bird while the feather removing operation is being performed.

6. In a device as set forth in claim 1, said gripping means including a comb like structure to go between the feathers and to close thereon, and a second stationary comb like structure to go between the feathers near their roots, adapted to press down the skin of the bird while the feather removing operation is performed.

7. In a device as set forth in claim 1, said gripping means including a stationary comb like structure and a movable comb like structure, the two being adapted to close upon one another and grip the feathers therebetween, or to be released from one another, and a second stationary comb like structure to go between the feathers near their roots, adapted to press down the skin of the bird while the feather removing operation is being performed.

8. In a device as set forth in claim 1, said gripping means including a stationary comb like structure and a movable comb like structure, the two being adapted to close upon one another, or to be released from one another, and a bar to swiftly move across underneath said comb like structures when they are closed upon one another to remove the feathers by tearing them out underneath said two combs.

9. In a device as set forth in claim 1, said gripping means including a stationary comb like structure and a movable comb like structure, the two being adapted to close into one another so as to grip the feathers between them or to be released from one another, a bar swiftly movable across underneath said comb structures when they are closed upon one another to tear the feathers out, and a second bar to pass across said two comb like elements when they are opened up, to remove the feathers torn from the skin.

10. In a device as set forth in claim 1, said gripping means including a comb like structure to go between the feathers and to close thereon, a second stationary comb like structure to go between the feathers near their roots to press down the skin of the bird, while the feather tearing operation is being performed, a bar adapted to swiftly move across underneath said comb structures when they are closed upon one another to tear the feathers out, and a second bar to pass across said two comb like elements when they are opened up, t remove the feathers torn from the skin.

11. In a device to remove the feathers from the body of a bird, a housing, a stationary comb like element forwardly projecting from the bottom of said housing and adapted to go between the feathers near their roots and to be pressed down upon the skin of the bird, a second comb like structure at the front of said housing over said first structure being also secured thereto in a stationary manner, and a third comb like structure movable over the top of said second comb structure in a cross-wise manner, said comb like structures being adapted to pass with their elements between the feathers of a bird, and to grip them when said second and third structures are moved in relation to one another, means within said housing to move said third structure across and above said second structure when so desired, a transversal bar between said second and first structures adapted to be swiftly moved across them and tear the feathers out thereby when said feathers are gripped, a second transversal bar across said second comb like structure, means within said housing to move said first bar in a forward direction when the feathers are gripped and to return it, means in said housing to move said second bar in a forward direction when said feathers are released from the grip of said second and third comb structures after being torn from their sockets, and a handle on said housing to hold and operate said device.

12. In a device as set forth in claim 11, said means to operate said combs and bars, being centrally operated within said housing by electrical means.

13. In a device of claim 11, an electrically driven friction disk in about the center of the housing, a rockable lever on said handle with a grip end on its outer arm, the end of the inner arm reaching within said housing and carrying said third comb like structure, so that by pressing the grip end to the handle said third comb will be caused to move across said second comb structure, as described, a rack slidable in said housing in a forward and backward direction and carrying said first bar at its front end, a gear carried by the inside end of said rockable lever, adapted to mesh with said bar and to contact with and be driven by said friction disk when said lever is operated but normally being in an inoperative position, a second rocking lever on said handle with an outer grip end, the inside end of the same carrying a second gear, a second rack slidable lengthwise of said housing, carrying said second bar at its front end over said first bar, and a distance from the same, said second rack and said second gear being set into operative engagement when said second lever is pressed to the handle but being normally in inoperative position, and spring means within said housing to return the parts to their original positions when said levers are released.

Signed at New York, in the county of New York, and State of New York, this 15th day of February, A. D. 1927.

ALEXANDER VERMES.
SOLOMON STERN.
LEIB GRODZICKER.